US012527418B2

United States Patent

(12) United States Patent
Rabin et al.

(10) Patent No.: US 12,527,418 B2
(45) Date of Patent: Jan. 20, 2026

(54) NEONATAL RETENTION SYSTEM

(71) Applicant: THE FEINSTEIN INSTITUTES FOR MEDICAL RESEARCH, Manhasset, NY (US)

(72) Inventors: Jill Maura Rabin, New York, NY (US); Michael Nimaroff, Long Beach, NY (US)

(73) Assignee: THE FEINSTEIN INSTITUTES FOR MEDICAL RESEARCH, Manhasset, NY (US)

( * ) Notice: Subject to any disclaimer, the term of this patent is extended or adjusted under 35 U.S.C. 154(b) by 141 days.

(21) Appl. No.: 18/079,235

(22) Filed: Dec. 12, 2022

(65) Prior Publication Data

US 2023/0180946 A1 Jun. 15, 2023

Related U.S. Application Data

(60) Provisional application No. 63/289,432, filed on Dec. 14, 2021.

(51) Int. Cl.
*A47D 15/00* (2006.01)
*A47C 21/08* (2006.01)
*A61G 7/05* (2006.01)

(52) U.S. Cl.
CPC ............ *A47D 15/006* (2013.01); *A47C 21/08* (2013.01); *A47D 15/008* (2013.01); *A61G 7/0526* (2013.01); *A47D 15/005* (2013.01)

(58) Field of Classification Search
CPC .. A47D 15/006; A47D 15/008; A47D 15/005; A47D 15/00; A61G 7/0526; A61G 7/05; A47C 21/08; A47C 21/00
USPC ............ 5/426, 424, 655, 652, 659, 658, 946
See application file for complete search history.

(56) References Cited

U.S. PATENT DOCUMENTS

| | | | | |
|---|---|---|---|---|
| 4,882,799 A * | 11/1989 | Shapiro ................ | A47C 29/003 5/100 |
| 4,937,902 A * | 7/1990 | Ceike Shapiro ......... | A47D 7/00 5/507.1 |
| 6,721,974 B1 * | 4/2004 | Wilkinson ........... | A47D 15/008 5/498 |
| 7,784,124 B2 * | 8/2010 | Long .................... | A61G 7/0515 5/706 |
| 2009/0144908 A1 * | 6/2009 | Long .................... | A61G 7/0521 5/706 |
| 2023/0180946 A1 * | 6/2023 | Rabin .................. | A61G 7/0526 5/426 |

* cited by examiner

*Primary Examiner* — Robert G Santos
(74) *Attorney, Agent, or Firm* — Amster, Rothstein & Ebenstein LLP

(57) ABSTRACT

A neonatal retention or support system including a horizontal base configured for at least one of attachment to or placement on a mattress of a bed, and a wall attached to and extending vertically from and at least partially around the base, the wall comprising at least one pair of hinges to allow the retention system to follow an adjustment of the bed. The wall is flexible inwards to allow a person to lie on the bed, and inflexible outwards so that an infant disposed within the retention system is prevented from falling from the bed.

24 Claims, 7 Drawing Sheets

200
210
212
214
220

NEONATAL RETENTION SYSTEM

RELATED APPLICATIONS

This application claims priority to and the benefit of U.S. Provisional Application No. 63/289,432, filed Dec. 14, 2021 and entitled NEONATAL RETENTION SYSMEM FOR HOSPITAL BED, the contents of which are incorporated herein by reference in their entirety.

FIELD OF THE INENTION

The present disclosure relates to neonatal retention systems, akin to a bassinet large enough to encompass both mother and newborn, configured for placement next to or onto a hospital bed or chair.

BACKGROUND

A common practice in hospitals today is to allow a newborn baby to stay in the same room with the mother, as opposed to spending most of the time in the hospital's nursery. This practice, known as "rooming-in", is beneficial to the health and development of infants, and often makes feeding, comforting, and monitoring a new baby much easier.

While rooming-in has improved the bonding experience and breast feeding between mothers and newborns, the practice may compromise a mother's opportunity for uninterrupted rest, and possibly increase the risk of neonatal falls. Studies suggest that at least 60-1,600 newborn falls occur annually on postpartum floors. This number is speculated to be highly underreported as most falls are unwitnessed as they occur while parents are asleep. Exhausted mothers fall asleep while holding their newborn while in bed or a reclining chair. Furthermore, for parents who are recovering from a cesarean or more complex delivery, there is the additional consideration of a mother's mobility and possibly extended recovery course. In addition to possible injury from direct trauma from a fall to the floor, infant entrapment between bed rails leading to suffocation also occurs. The possible traumatic injuries sustained by newborns from a fall include linear skull fractures, traumatic encephalopathy, cranial bumps/bruising, cephalohematoma, intracranial bleeding, or in worse cases neonatal death. In addition, even when no serious injury has been sustained by the infant, it is understandably a distressing event for parents and staff members. This problem also brings about possible legal ramifications for hospitals.

To date, other than parent teaching policies such as discouraging infant holding while sleeping, hourly rounds by staff, or increased verbal precautions given to families, there are no strategies developed to prevent newborn falls or entrapment that are routinely used in hospitals. Conventional newborn bassinets include wheels and require a mother or staff to be standing to place a newborn inside, and thus do not address the above-mentioned concerns.

SUMMMARY OF THE INVENTION

An object of the present invention is to provide a system that directly attaches to a Hill-Rom (or other standard) postpartum bed or chair and which allows mothers to place newborns safely down without having to stand up or wait for assistance.

Another object of the present invention is to provide a system that eliminates or minimizes the risk of possible neonatal entrapment or accidental suffocation.

A neonatal retention or support system according to an exemplary embodiment of the present invention comprises: a horizontal base configured for at least one of attachment to or placement on a mattress of a bed; a wall attached to and extending vertically from and at least partially around the base, the wall comprising at least one pair of hinges to allow the retention system to follow an adjustment of the bed, wherein the wall is flexible inwards to allow a person to enter into and lie upon the bed, and wherein the wall is not flexible outwards so that an infant disposed within the retention system is prevented from falling from the bed.

According to an exemplary embodiment, the base comprises at least one strap configured to extend across and underneath a mattress to fasten the retention system in place.

According to an exemplary embodiment, the wall comprises at least three wall portions so that the wall surrounds at least three sides of a mattress.

According to an exemplary embodiment, the wall comprises a plurality of struts.

According to an exemplary embodiment, the plurality of struts comprises a plurality of vertically extending struts.

According to an exemplary embodiment, the plurality of struts comprises a plurality of horizontally extending struts.

According to an exemplary embodiment, the wall is removably attached to the base by a fastening mechanism.

According to an exemplary embodiment, the fastening mechanism is a hook and loop fastening system.

According to an exemplary embodiment, the fastening mechanism is a zipper.

A neonatal retention or support system according to an exemplary embodiment of the present invention comprises: a horizontal base configured for attachment to a chair; and a wall attached to and extending vertically from and at least partially around the base, wherein the wall is flexible inwards to allow a person to sit in the chair, and wherein the wall is not flexible outwards so that an infant disposed within the retention system is prevented from falling from the chair.

According to an exemplary embodiment, the system further comprises at least one pair of extensions configured to attached to arms of the chair.

According to an exemplary embodiment, the extensions are configured to slide into tracks on arms of the chair.

According to an exemplary embodiment, the extensions comprise tracks that fit over arms of the chair.

According to an exemplary embodiment, the base comprises at least one strap configured to extend across and underneath a chair bottom to fasten the retention system in place.

BRIEF DESCRIPTION OF THE DRAWINGS

The present invention will be better understood when read in conjunction with the appended drawings. It should be understood, however, that the invention is not limited to the precise arrangements shown. In the drawings.

DETAILED DESCRIPTION

Figure 1:
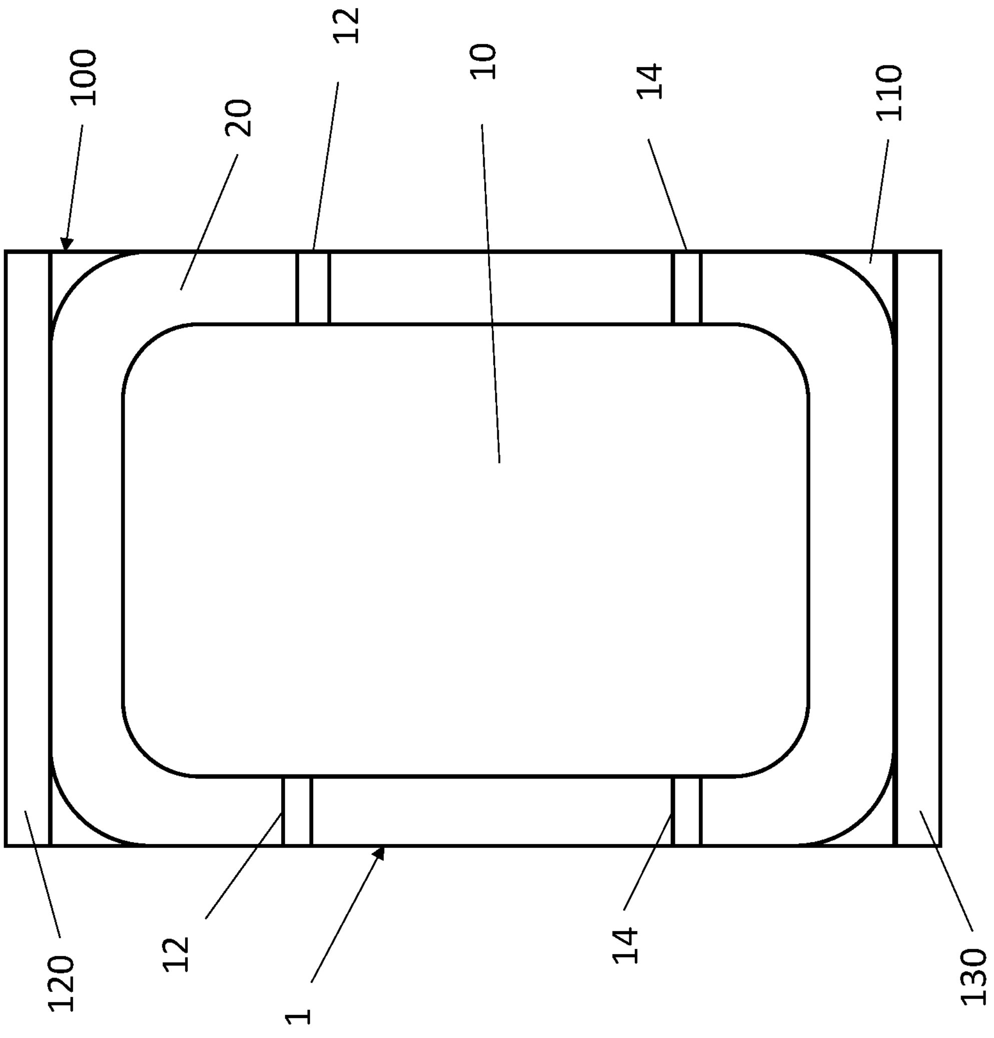
FIG. 1 shows a top plan view of a neonatal retention or support system according to an exemplary embodiment of the present invention attached to a hospital bed.

FIG. 1 is a top view of a neonatal retention or support system, generally designated by reference number 1, according to an exemplary embodiment of the present invention. The system 1 is configured for placement on a bed 100, which may include a mattress 110, a headboard 120 and a footboard 130. The system 1 includes a generally rectangular horizontal base 10 and a wall 20 extending around the base 10. In exemplary embodiments, the wall 10 may extend completely around the base 10 or may extend partially around the base 10. For example, the wall 10 may be generally U-shaped so as to only run directly adjacent to the headboard 120 and along the longitudinal sides of the mattress 110, thereby leaving the footboard 130 exposed. In a preferred exemplary embodiment, the wall 10 extends completely around the bed so as to form a four-sided enclosure.

The wall 20 may include a first pair of hinges 12 that allow the system 1 to accommodate upward or downward adjustment of the head portion of the bed 100. The wall 20 may optionally include a second pair of hinges 14 that allow the system 1 to accommodate upward or downward adjustment of the foot portion of the bed 100.

In exemplary embodiments, the wall 20 is flexible inwards to allow a person (e.g., a mother) to enter into and lie upon the bed adjacent to and enclosed by the system 1. Preferably, the wall 20 is not flexible outwards so that an infant disposed within the retention system is prevented from falling from the bed. In accordance with an exemplary embodiment, at least the longitudinally extending sides of the wall 20 has a tensile strength of up to 10 lbs/sq in., preferably up to 20 lbs/sq in., more preferably up to 30 lbs/sq in., and even more preferably up to 50 lbs/sq. in. In exemplary embodiments, at least one of the longitudinally extending walls is prevented from flexing outwards by a locking mechanism, such as, for example, a hinge locking mechanism. This allows a mother to be in the same bed as her newborn while maintaining the safety of the newborn. Also, in exemplary embodiments, the wall 20 may not be flexible inwards.

The base 10 and wall 20 may be made of plastic mesh material, an example being mesh made of coated or uncoated polyester yarns. A more specific example is polyester yarns coated with polyvinyl chloride (PVC), commercially available as Textilene® (Twitchell Corp., Dothan, Alabama, USA). Other suitable materials may be used, and the examples provided herein are not intended to be limiting.

Figure 2:
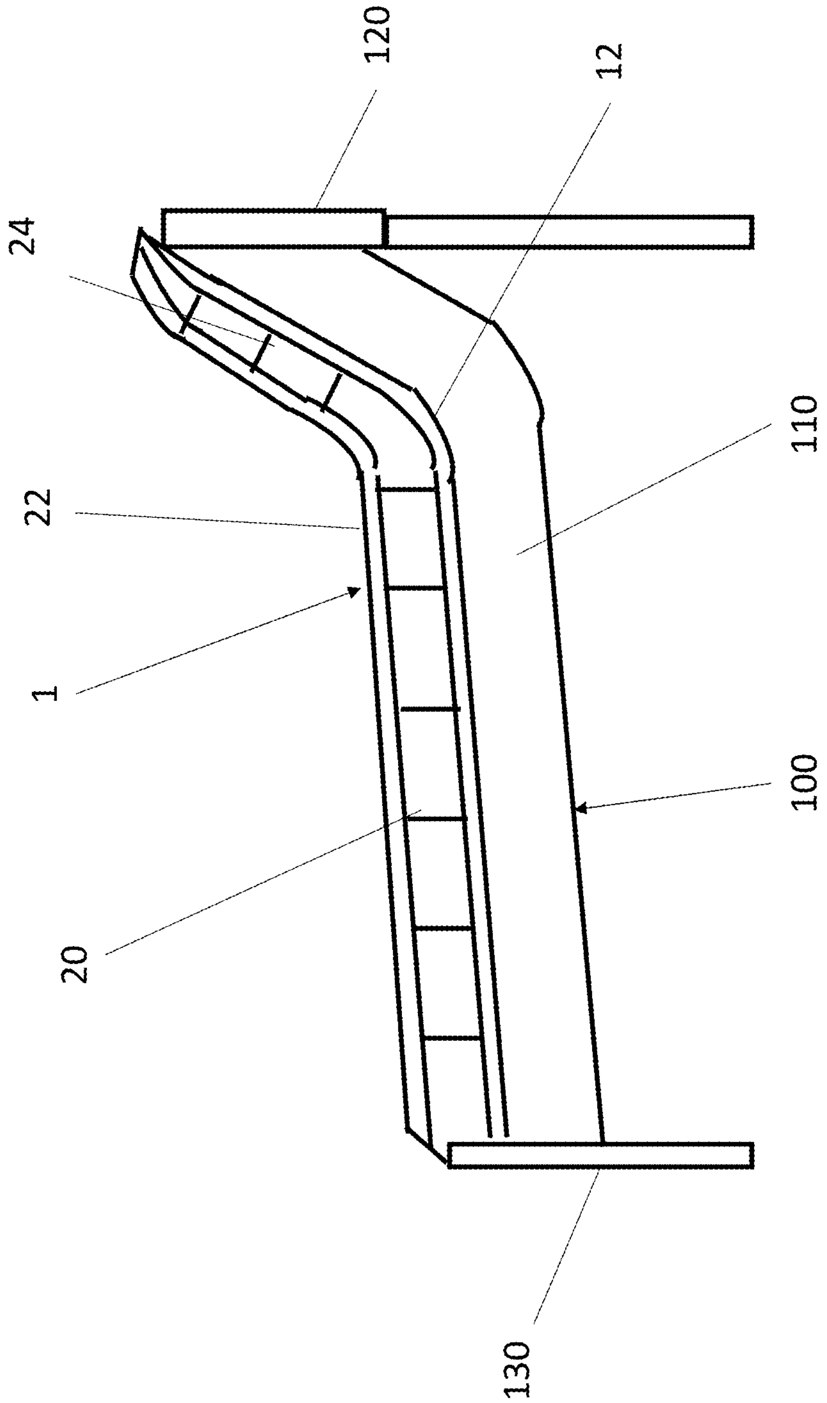
FIG. 2 shows a side view of a neonatal retention or support system according to an exemplary embodiment of the present invention.

FIG. 2 is a side view of the system 1, showing more detailed elements of the wall 20. Specifically, in exemplary embodiments, the wall 20 includes a frame made up of horizontally extending struts 22 and vertically extending struts 24. The outer material (e.g., plastic mesh) of the wall 20 may be disposed in tension around the frame. The struts 22, 24 may be made of any suitable material, such as, for example, aluminum or plastic. In exemplary embodiments, the struts 22, 24 may be telescoping relative to one another to allow the system 1 to be adjusted in size. For example, the horizontally extending struts 22 may be adjusted to increase or decrease the width and/or length of the system 1, and/or the vertically extending struts 24 may be adjusted to increase or decrease the height of the system 1.

In exemplary embodiments, the height of the wall 20 may vary along its length. For example, the height of the wall 20 may be less towards the foot portion of the bed as compared to the head portion of the bed. In a specific exemplary embodiment, the height of the wall 20 is approximately 8 inches at the foot portion of the bed and then rises to approximately 9 inches two-thirds of the way towards the head portion of the bed.

In exemplary embodiments, the system 1 may include one or more straps for fastening the system 1 to a mattress and/or bed frame. The straps may be attached to the base 10 and/or wall 20 and be configured to extend under the mattress and/or bed frame. The straps may be adjustable in length to accommodate different sized beds.

FIGS. 3A-3E show a neonatal retention system, generally designated by reference number 200, according to another exemplary embodiment of the present invention. The system 200 is generally the same as the system 1, except that the base of the system 200 is configured for placement under a mattress. Specifically, the system 200 includes a base 210 and a wall 220 that together form a frame into which a mattress may be placed. The wall 220 has enough height to rise above the top surface of the mattress to thereby surround the bed. The base 210 may include one or more straps 212 configured for tightening around the mattress so that the system 200 is fastened to the bed. In exemplary embodiments, the straps may be adjustable to accommodate different sized mattresses.

Figures 3A, 3B, 3C, 3D, 3E:
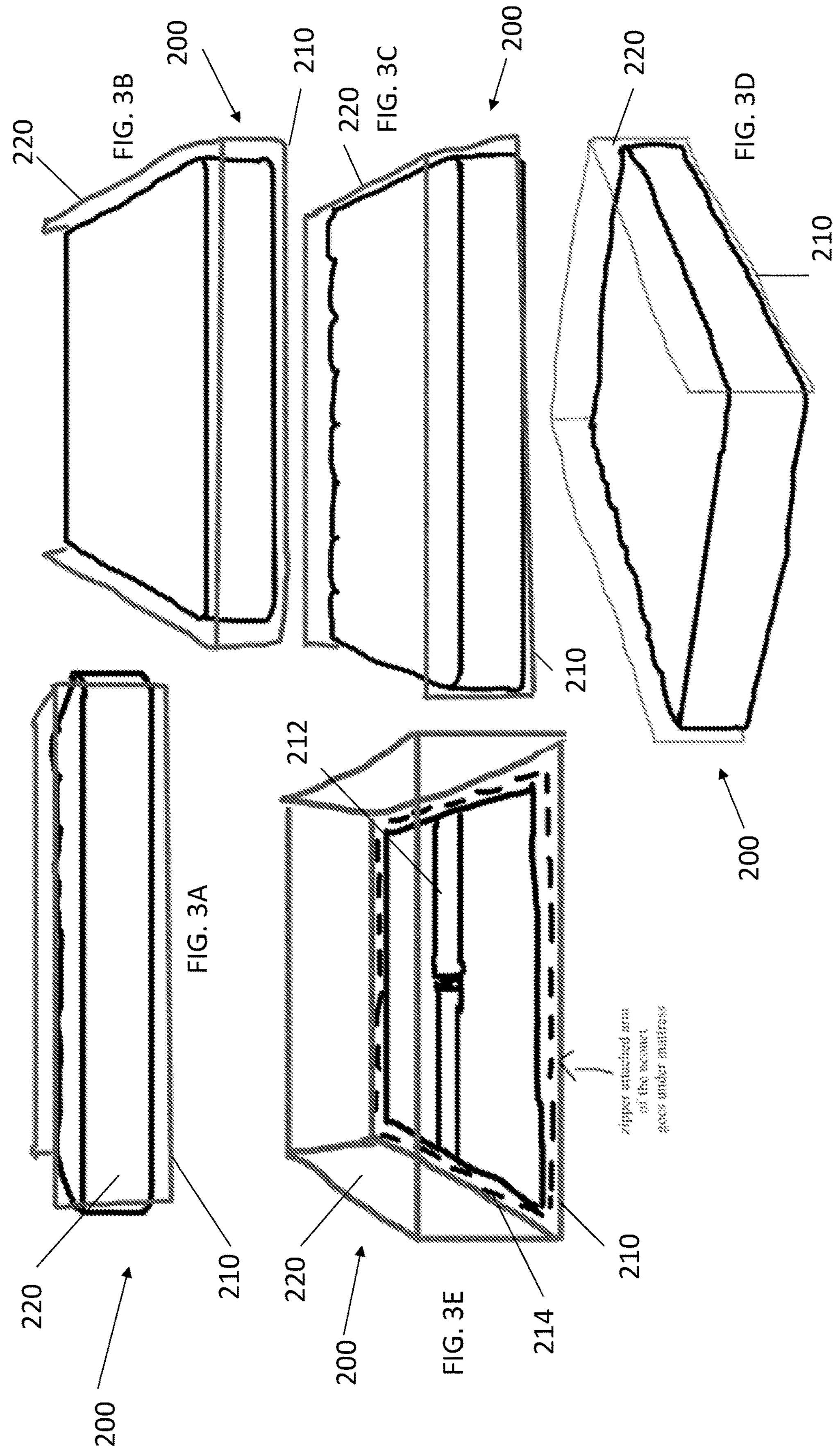
FIGS. 3A-3E show various view of a neonatal retention or support system according to another exemplary embodiment of the present invention.

As best shown in FIG. 3E, the base 210 is configured as a rectangular-shaped frame, including laterally and longitudinally extending frame elements. The base 210 may be removably attached to the wall 220 using fastening elements 214. Although FIG. 3E shows the fastening elements as zippers, any other types of fastening elements may be used, such as, for example, hook and loop fasteners, button fasteners or clips. In exemplary embodiments, the base 210 may not be removably attached to the wall 220 but instead may be fixed to the wall 220 so as to form a unitary structure.

In exemplary embodiments, the wall may include separate wall portions that are removable from one another. This allows for removal of portions of the wall at locations around the bed, for example, at the foot of the bed, in case a complete surround of the mattress is not necessary.

In exemplary embodiments, the neonatal retention system is configured for use on a standard postpartum hospital bed, such as, for example, a Hill-Rom postpartum bed (Hillrom, Chicago, IL., USA). In exemplary embodiments, the neonatal retention system may be modified in size and/or shape to accommodate other areas where parents/mothers hold/bond/breastfeed their newborns and babies. For example, the neonatal retention system may be configured to accommodate use on a recliner chair or home bed.

Figure 6A:
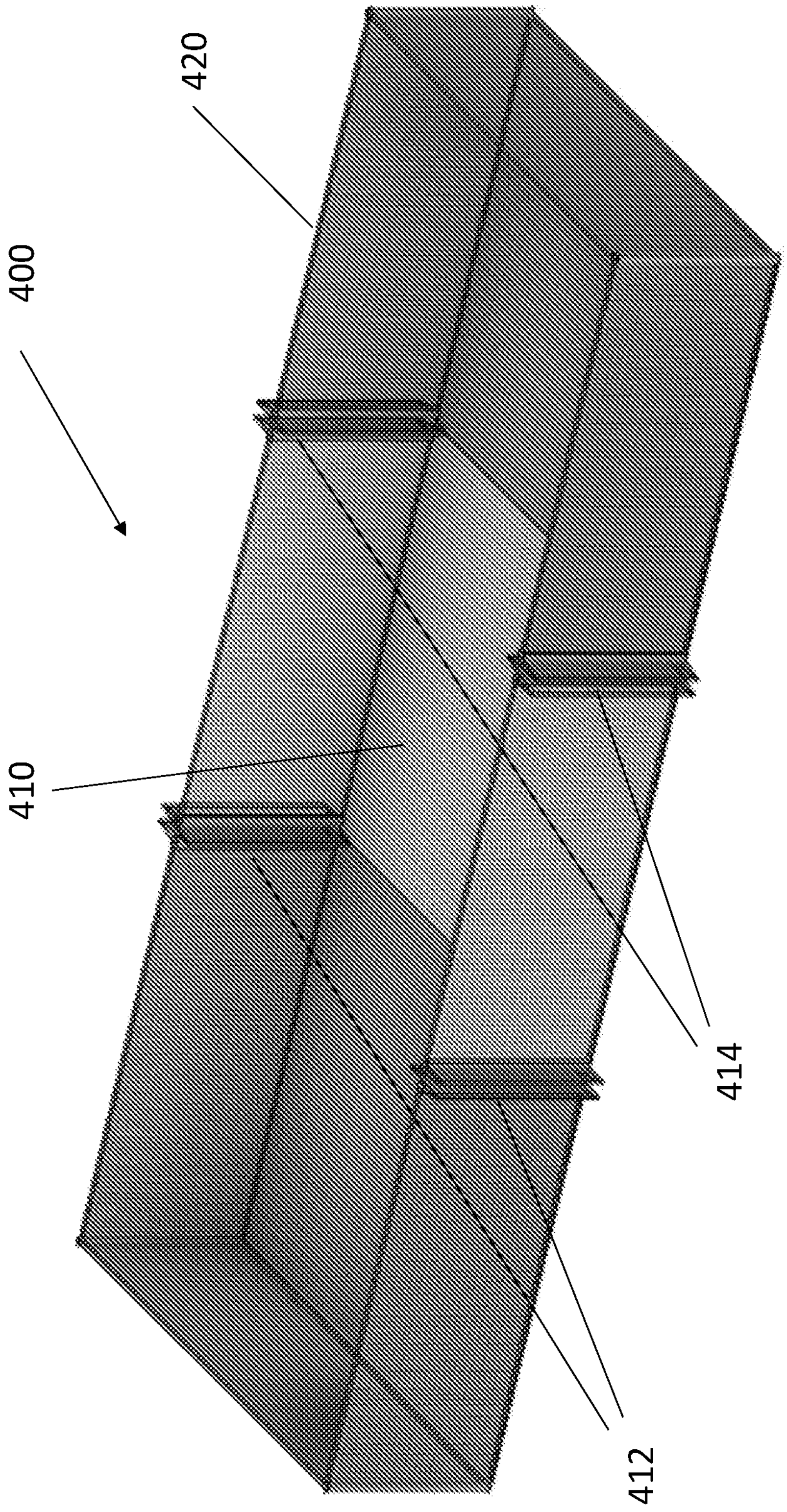
FIG. 6A is a perspective view of a neonatal retention or support system according to an exemplary embodiment of the present invention.
Figure 6B:
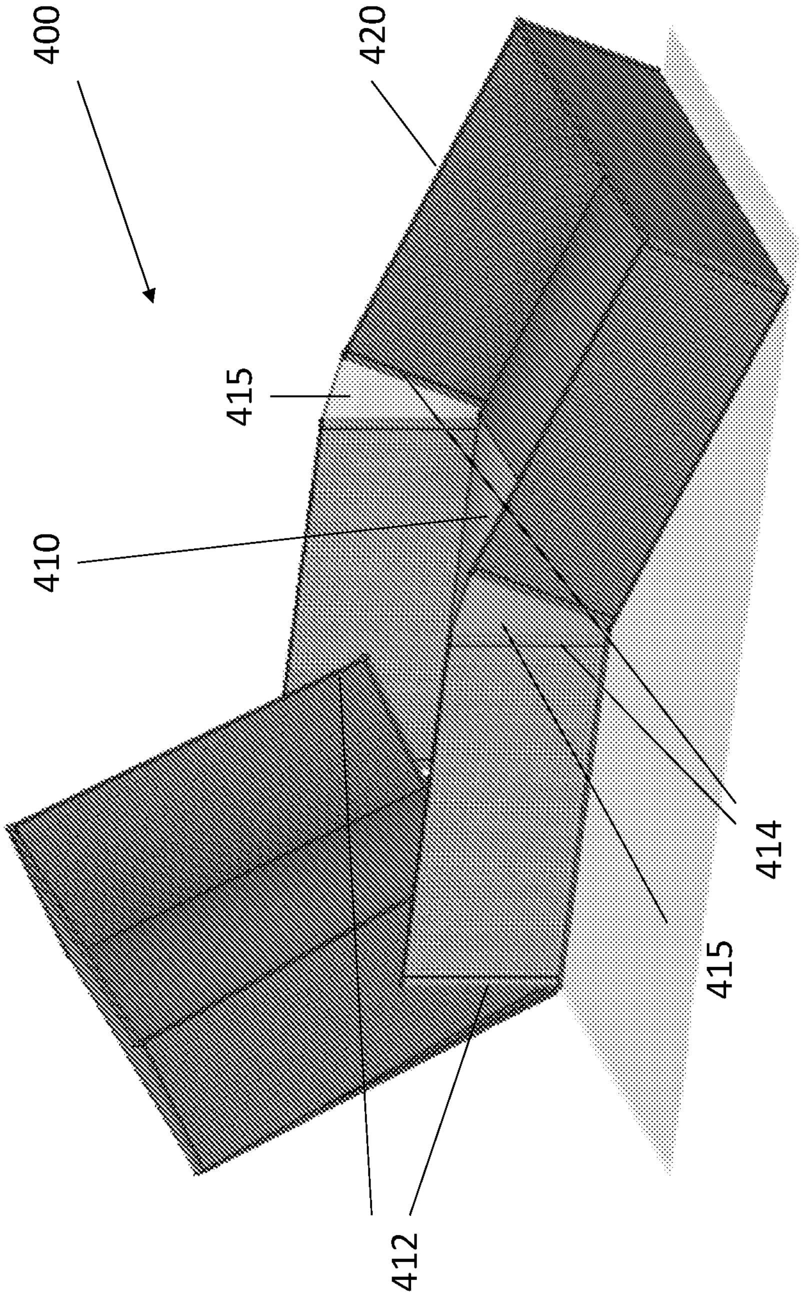
FIG. 6B is a perspective view of the neonatal retention or support system of FIG. 6A in a folded configuration.

FIGS. 6A and 6B are perspective views of a neonatal retention or support system, generally designated by reference number 400, according to an exemplary embodiment of the present invention. As in the previous exemplary embodiments, the system 400 includes a generally rectangular horizontal base 410 and a wall 420 extending around the base 410. The wall 420 extends completely around the base 410 so as to form a four-sided enclosure. The wall 420 includes a first pair of hinges 412 that allow the system 400 to accommodate upward or downward adjustment of the head portion of the bed, and a second pair of hinges 414 that allow the system 400 to accommodate upward or downward adjustment of the foot portion of the bed. As shown best in FIG. 6B, each hinge 412, 414 may be made up of a stretchable piece of fabric or mesh 415 fixed to the ends of sections of the system 400 so that when the sections are adjusted relative to one another the pieces of fabric or mesh 415 stretch and/or fold to accommodate the adjustment.

Figure 4:
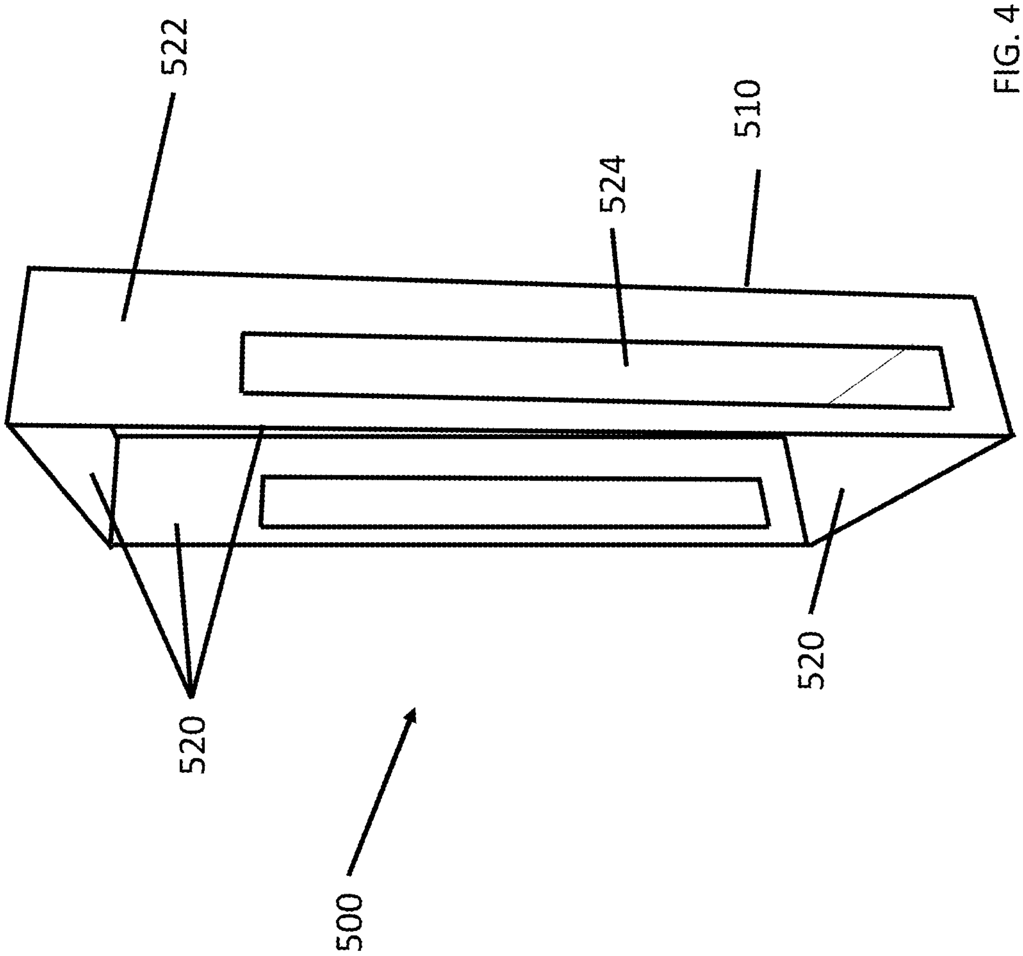
FIG. 4 is a photograph of a neonatal retention or support system according to an exemplary embodiment of the present invention.

FIG. 4 is a photograph of a neonatal retention or support system, generally designated by reference number 500, according to an exemplary embodiment of the present invention. As described, the system 500 includes a base 510 and side walls 520 extending around the base 510. The side walls 520 are made up of a frame 522 and mesh material 524 extending across openings in the frame.

Figure 5:
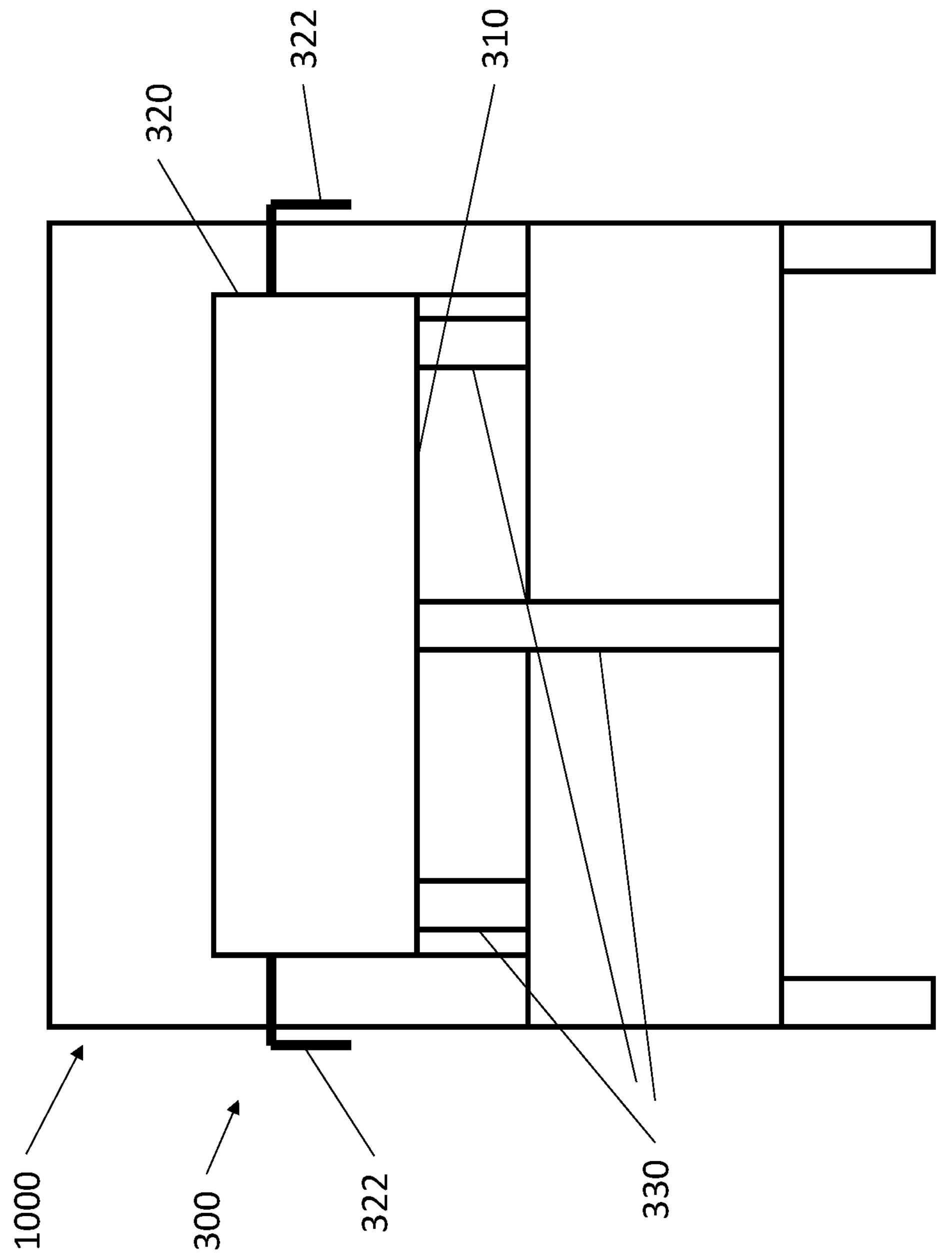
FIG. 5 is a neonatal renention or support system according to an exemplary embodiment of the present invention.

FIG. 5 is a front view of a neonatal retention or support system, generally designated by reference number 300, according to an exemplary embodiment of the present invention. The system 300 differs from previously-described embodimnets in that it is configured for attachment to and use with a chair, such as a recliner chair. The system 300 includes a generally rectangular horizontal base 310 and a wall 320 extending around the base 310. In exemplary embodiments, the wall 310 may extend completely around the base 310 or may extend partially around the base 310. In use, the mother would sit in the chair 1000 with the system 300 arranged above or on her legs, with the long side of the system 300 directly opposite to her. The short side of the system 300 may include extensions 322 that attached to the arms of the chair 1000. For example, the extensions 322 may be configured to slide into tracks on the chair arms or may themselves include tracks that fit over the chair arms, to thereby allow the system 300 to be slid in and out relative to the chair back. The extensions 322 may include attachment mechansims, such as, for example, hook-and-loop attachments or snap attachments, for attaching to the chair arms.

In exemplary embodiments, the system 300 may include straps 330 that extend around the bottom of the chair 1000 to better secure the system 300 in place. As shown in FIG. 5, the straps 330 may be arranged in a triangular manner, with two or more in the back and one in the front, to allow room for the mother's legs.

As in the previous exemplary embodiments, the wall 320 is flexible inwards to allow a person (e.g., a mother) to sit in the chair adjacent to the system 300 and the wall 320 is preferably not flexible outwards so that an infant disposed within the retention system is prevented from falling from the chair.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

We claim:

1. A neonatal retention system comprising:

a horizontal base configured for at least one of attachment to or placement on or placement under a mattress of a bed;

a wall attached to and extending vertically from and at least partially around the base, the wall comprising a substantially flexible material and at least one pair of hinges to allow the retention system to follow an adjustment of the bed, the wall further comprising a locking mechanism, wherein the substantially flexible material allows the wall to flex inwards to allow a person to enter into and lie on the bed, and wherein the wall is prevented from flexing outwards by the locking mechanism so that an infant disposed within the retention system is prevented from falling from the bed.

2. The neonatal retention system of claim 1, wherein the base comprises at least one strap configured to extend across and underneath a mattress to fasten the retention system in place.

3. The neonatal retention system of claim 1, wherein the wall comprises at least three wall portions so as to surround at least three sides of a mattress.

4. The neonatal retention system of claim 1, wherein the wall comprises a plurality of struts.

5. The neonatal retention system of claim 4, wherein the plurality of struts comprises a plurality of vertically extending struts.

6. The neonatal retention system of claim 4, wherein the plurality of struts comprises a plurality of horizontally extending struts.

7. The neonatal retention system of claim 1, wherein the wall is removably attached to the base by a fastening mechanism.

8. The neonatal retention system of claim 7, wherein the fastening mechanism is a hook and loop fastening system.

9. The neonatal retention system of claim 7, wherein the fastening mechanism is a zipper.

10. The neonatal retention system of claim 1, wherein the wall and the base form a unitary structure.

11. The neonatal retention system of claim 1, wherein the wall comprises four wall portions so as to surround four sides of a mattress.

12. The neonatal retention system of claim 1, wherein the substantially flexible material comprises a mesh material.

13. The neonatal retention system of claim 12, wherein the mesh material comprises a coated or uncoated polyester yarn.

14. The neonatal system of claim 13, wherein the polyester yarn is coated.

15. The neonatal system of claim 14, wherein the polyester yarn is coated with polyvinyl chloride.

16. A neonatal retention system comprising:

a horizontal base configured for attachment to a chair; and a wall comprising a substantially flexible material and which is attached to and extends vertically from and at least partially around the base, the wall comprising a locking mechanism, wherein the substantially flexible material allows the wall to flex inwards to allow a person to sit in the chair, and wherein the wall is prevented from flexing outwards by the locking mechanism so that an infant disposed within the retention system is prevented from falling from the chair.

17. The neonatal retention system of claim 16, further comprising at least one pair of extensions configured to attach to arms of the chair.

18. The neonatal retention system of claim 17, wherein the extensions are configured to slide into tracks on arms of the chair.

19. The neonatal retention system of claim 17, wherein the extensions comprise tracks that fit over arms of the chair.

20. The neonatal retention system of claim 16, wherein the base comprises at least one strap configured to extend across and underneath a chair bottom to fasten the retention system in place.

21. The neonatal retention system of claim 16, wherein the substantially flexible material comprises a mesh material.

22. The neonatal retention system of claim 21, wherein the mesh material comprises a coated or uncoated polyester yarn.

23. The neonatal system of claim 22, wherein the polyester yarn is coated.

24. The neonatal system of claim 23, wherein the polyester yarn is coated with polyvinyl chloride.

* * * * *